United States Patent [19]

Desbois et al.

[11] 4,146,783
[45] Mar. 27, 1979

[54] MULTIPLEXED OPTICAL COMMUNICATION SYSTEM

[75] Inventors: Jean Desbois; Pierre Tournois, both of Paris, France

[73] Assignee: Thomson-CSF, Paris, France

[21] Appl. No.: 832,953

[22] Filed: Sep. 13, 1977

[30] Foreign Application Priority Data

Sep. 17, 1976 [FR] France .................. 76 28021

[51] Int. Cl.$^2$ .................................. H04B 9/00
[52] U.S. Cl. ............................ 250/199; 350/162 R
[58] Field of Search ............ 250/199; 350/150, 162 R, 350/168; 356/111

[56] References Cited

U.S. PATENT DOCUMENTS

| 3,501,223 | 3/1970 | Rack .............................. 250/199 |
| 3,506,834 | 4/1970 | Buchsbaum et al. .......... 250/199 |
| 3,549,239 | 12/1970 | Brienza et al. ................. 350/162 R |
| 3,679,904 | 7/1972 | Weiner .......................... 250/199 |
| 3,861,801 | 1/1975 | Peters et al. .................. 350/162 R |
| 3,873,825 | 3/1975 | Jones et al. ................... 250/199 |
| 3,920,983 | 11/1975 | Schlafer et al. .............. 250/199 |

OTHER PUBLICATIONS

Kosanke et al.—Optical Information Transfer System, IBM Tech. Disclosure, vol. 9, #8, Jan. 1967, pp. 997, 998.

Primary Examiner—Robert L. Griffin
Assistant Examiner—Joseph A. Orsino, Jr.
Attorney, Agent, or Firm—Cushman, Darby & Cushman

[57] ABSTRACT

The system permits the multiplex telecommunication through the medium of an optical carrier wave. The system comprises a source of coherent light whose optical spectrum is dispersed in an optical device comprising a pair of diffraction gratings. A plurality of light modulators are disposed in the path of the spread out beams and controlled by electric signals which carry items of information. Output optical means collect the modulated spectral components.

8 Claims, 8 Drawing Figures

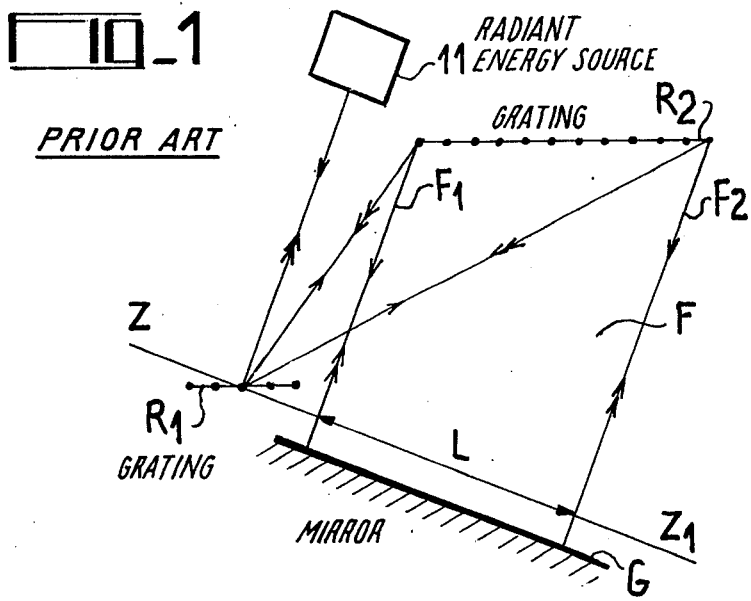
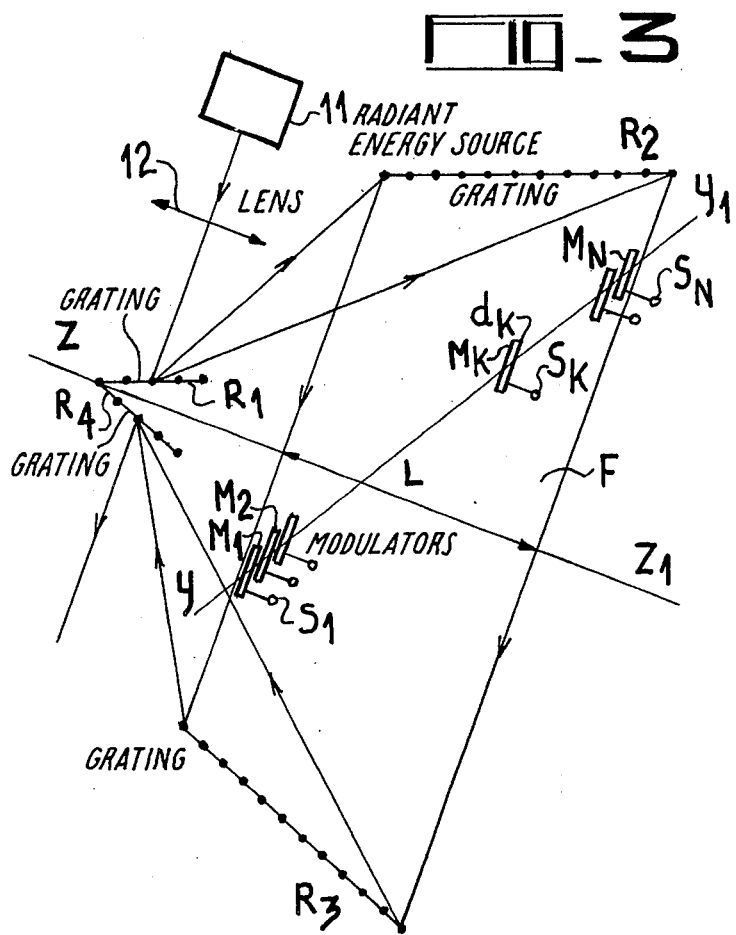

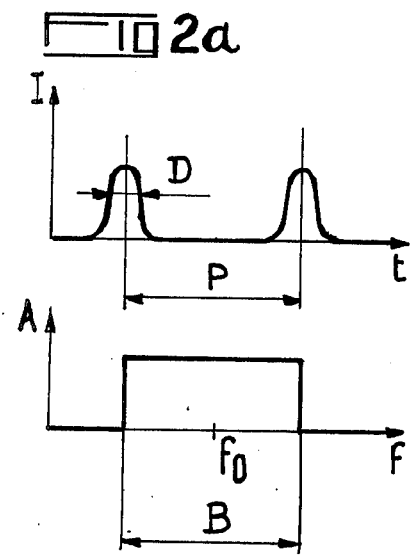
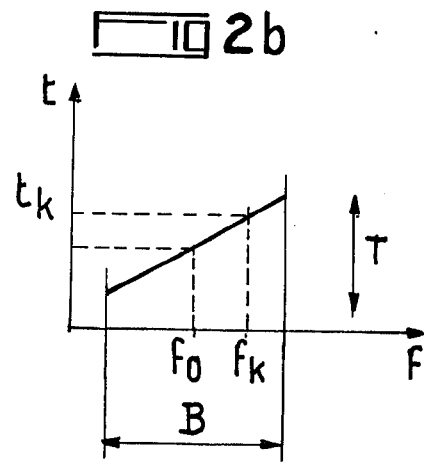
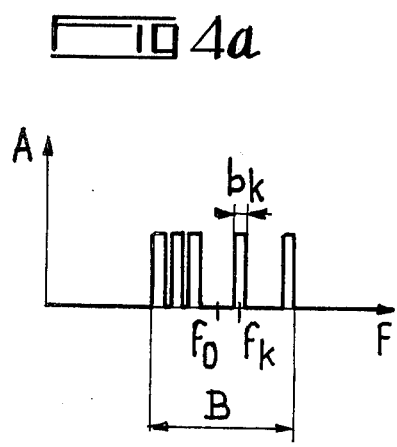
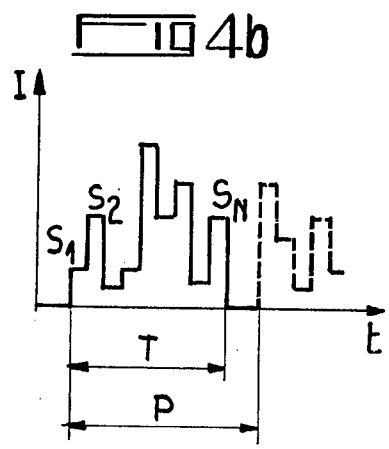

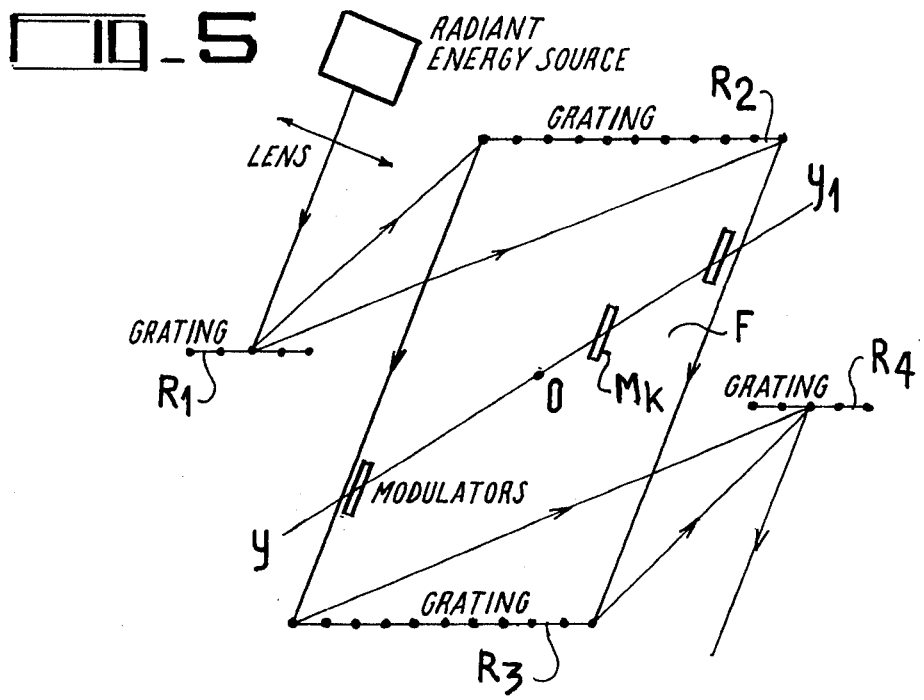
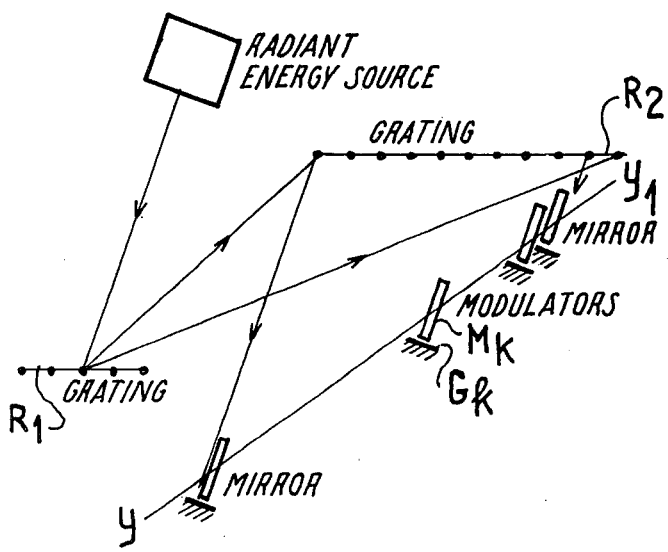

MULTIPLEXED OPTICAL COMMUNICATION SYSTEM

The invention relates to a multiplexed optical communication system for transmitting electrical signals carrying information. It relates more particularly to the modulation by N signals of the spectral components of a beam of pulsed optical energy allowing the multiplexing of these N signals.

An optical dispersive device termed "diffraction grating pair," has been disclosed by E.B. Treacy in IEEE Journal of Quantum Electronics, Volume QE-5, No. 9, pages 454–458 of September 1969.

Such a prior art optical device is diagrammatically represented in FIG. 1. It comprises two diffraction gratings $R_1$ and $R_2$ combined with a mirror G. The engraved lines of the two gratings have the same constant periodicity and are parallel with each other and from one grating to the other. A mode locked laser device 11 provides a pulsed optical energy in the form of pulses of very short duration D, in relation with their repetition period P, as indicated in FIG. 1-$a$. The spectral content of the optical pulses as a function of the frequency is located in a bandwidth B centered on a frequency $f_o$. The duration D is longer than, or equal to 1/B. Pulse durations of a few tens of picoseconds and repetition periods of a few nanoseconds are usually achieved.

The train of optical pulses is first diffracted by the grating $R_1$, then by the grating $R_2$. The disposition of the gratings is such that, after diffraction by $R_2$, all the rays corresponding to frequencies $f_k$ within the band B of the input pulses are parallel to the direction of the incident laser beam and are spatially dispersed. There is thus provided a luminous beam F spatially dispersed as a function of the frequency, and its width L, measured along an axis $ZZ_1$ perpendicular to the direction of the beam F, corresponds to the amplitude of the spatial dispersion of the component frequencies contained within the band B. Using a mirror G placed in the direction of axis $ZZ_1$, the rays of the beam F are made to travel through the return path and there is obtained at the output of the system a luminous beam, whose direction is opposite to the incident beam and comprises a train of periodic pulses which are time dispersed by a duration T which corresponds to the differences of paths travelled through, in the forward and return directions, by the two end rays $F_1$ and $F_2$. There is therefore obtained, for each pulse of the input luminous signal, a pulse of duration T which corresponds to the dispersion amplitude of the dispersing filter in the input band B, as shown in FIG. 2$b$. This pulse has a duration T distinctly longer than the duration D of the input pulse, and for a given energy, its mean amplitude is smaller. Advantageously, a duration T slightly shorter than the period P is chosen.

The duration and the form of the luminous pulses obtained as a function of time at the output of the above described device may be modified by acting on the rays of the spatially dispersed beam F, for example by interposing in the beam F masks which are more or less absorbent and placed parallel to the axis $ZZ_1$. Such masks permit a calibration of the luminous pulses of the laser, as disclosed in the article published by J. DESBOIS, F. GIRES and P. TOURNOIS in the reports of the Academie des Sciences — PARIS — Series B, volume 270, pages 1604–1606 — 1970.

The system according to the invention permits, owing to an original structure which employs the teaching contained is particular in the aforementioned documents, a multiplex transmission of items of information owing to the optical signal modulation.

In accordance with the present invention, there is provided a multiplexed optical communication system for simultaneously transmitting N distinct electrical signals, said system comprising a source of pulsed optical radiation, optical dispersion means arranged for spreading out N adjacent spectral components pertaining to said pulsed optical radiation thereby providing a set of N distinct subcarrier waves, optical focussing means arranged between said source and said optical dispersion means for focussing said N subcarrier waves onto a line, N elementary optical modulators arranged along said lines for respectively modulating said N subcarrier waves in accordance with said N electrical signals, and output means arranged for feeding into a multiplexed transmission channel the N modulated subcarrier waves emerging from said N optical modulators; said optical dispersion means comprising two planar gratings having the same pitch and arranged parallel to one another for successively dispersing said pulsed optical radiation; the lines of said gratings being parallel to one another for causing said subcarrier waves to propagate along paths parallel to the direction of incidence of said pulsed optical radiation onto said optical dispersion means.

For a better understanding of the invention, and to show how the same may be carried into effect, reference will be made to the ensuing description, and to the accompanying drawings among which:

FIG. 1 is a simplified diagram of an optical device according to the prior art;

FIGS. 2$a$ and 2$b$ are diagrams illustrating the operation of the device shown in FIG. 1;

FIG. 3 shows a coding system according to the invention;

FIGS. 4$a$ and 4$b$ are explanatory diagrams of the operation of the system according to FIG. 3;

FIG. 5 shows another embodiment of the system in accordance with the invention;

FIG. 6 shows another embodiment of the system in accordance with the invention.

The preferred embodiment of the proposed device, diagrammatically represented in FIG. 3, advantageously comprises, in addition to a laser 11 and two diffraction gratings $R_1$, $R_2$ as described before, two other diffraction gratings $R_3$ and $R_4$ and a number N of optical modulators.

The optical modulators employed are for example of the electro-optical type known per se. Such a modulator is formed of a crystal subjected to an electric field. The variations of this field imposed by an electric control signal $S_k$ influence by virtue of the birefringence effect the polarized light and these polarization variations are converted into variations of luminous intensity. Such a type of modulation is described in an article by KAMINOW and TURNER in Applied Optics, Vol. 5, NO. 10, October 1966, pages 1612–1628.

The two diffraction gratings $R_3$ and $R_4$ are placed symmetrically with the gratings $R_1$ and $R_2$ relative to a plane perpendicular to the direction of the incident laser beam, indicated by the axis of symmetry ZZ, in FIG. 3. The lengths of diffrent paths followed by the rays of the beam F differ as a function of the frequency and the system achieves both a spatial spread out and time dispersion of the luminous pulses. The N modulators $M_k$ are placed in the path of the rays of the beam F, after diffraction by the grating $R_2$, between the two gratings $R_2$ and $R_3$. If the dimension of the input pupil of a modulator $M_k$ is equal to $d_k$ in the direction of the axis $ZZ_1$, this modulator affects a component $b_k$, centered around $f_k$, of the spectral content of the laser pulses. The band B of the pulses is thus divided into N frequency bands $b_1, b_2 \ldots b_k, b_N$ of central frequencies $f_1, f_2 \ldots f_k, f_N$ as shown in FIG. 4a.

By placing a plurality of modulators in adjoining relation, it is possible to cause the luminous pulses to carry the information contained in N electrical signals $S_1, S_2 \ldots S_N$ by modulating the luminous intensity, or the phase, of the sole paths which correspond to the frequencies within the bands $b_k$. The transmission characteristics in intensity or phase are modifiable in an interval of time shorter than the period P.

The dimension $d_k$ of the input pupil will be reduced to a minimum to be able to increase the number of modulator signals S. Dimensions of the order of the millimeter are possible.

However, it is necessary that the spectral resolution of the spatial dispersion of the beam F be less than, or equal to the band $b_k$ defined by the dimension $d_k$. In other words, a monochromatic luminous beam of frequency $f_k$, after having been diffracted by the networks $R_1$ and $R_2$, must completely pass through the input pupil of the corresponding modulation $M_k$; overlapping of frequency bands is in this way avoided.

With a view to improve this resolution, optical means are provided, such as for example a lens 12, between the laser source 11 and the grating $R_1$ which focuses the beam F.

The modulators M are then disposed on the locus $YY_1$ of the focusing of the rays corresponding to the frequencies $f_k$.

The luminous output signal is in the form of a train of pulses dispersed in time and modulated such as diagrammatically shown in FIG. 4b in the case of a modulation of the luminous intensity.

In one embodiment, it is possible to add signals without obtaining a time dispersion. For this, the gratings $R_3$ and $R_4$ are disposed in accordance with the diagram of FIG. 5, that is to say, symmetrically with the gratings $R_1$ and $R_2$ relative to a centre of symmetry 0 located on the median axis of the beam F.

According to another embodiment, the modulators M are disposed between the grating $R_2$ and the mirror G reflecting the rays of the beam F. If only two diffraction gratings are used instead of four, the rays of the beam F cannot be focused on all the modulators M. Since the rays cannot be focused in the forward and return directions, the modulators must be placed on the mirror. However, the reflecting surface of the mirror is not the locus $YY_1$ of the foci.

According to still another embodiment, this drawback is avoided by placing each time a mirror $G_k$ at the output of each of the modulators M, these mirrors being disposed on the locus $YY_1$ of the foci. However, this device, shown in FIG. 6, is no longer time dispersive.

In any case, optical means may be disposed at the output of the proposed device to collimate the output laser beam.

The device according to the invention is of utility in optical systems for treating or transmitting items of information at a very high rate which may attain multiplexing frequencies of several tens of gigahertz for about fifty multiplexed signals.

There have been described different devices for signal multiplexed signal transmission by laser pulses which may be used for the transmission of items of information by optical channels such as for example optical fibres.

What we claim is:

1. Multiplexed optical communication system for simultaneously transmitting N distinct electrical signals, said system comprising a source of pulsed optical radiation, optical dispersion means arranged for spreading out N adjacent spectral components pertaining to said pulsed optical radiation thereby providing a set of N distinct subcarrier waves, optical focusing means arranged between said source and said optical dispersion means for focusing said N subcarrier waves onto a line, N elementary optical modulators arranged along said line for respectively modulating said N subcarrier waves in accordance with said N electrical signals, and output means arranged for feeding into a multiplexed transmission channel the N modulated subcarrier waves emerging from said N optical modulators; said optical dispersion means comprising two planar gratings having the same pitch and arranged parallel to one another for successively dispersing said pulsed optical radiation; the lines of said gratings being parallel to one another for causing said subcarrier waves to propagate along paths parallel to the direction of incidence of said pulsed optical radiation onto said optical dispersion means.

2. System as claimed in claim 1, wherein said output means comprise two further planar gratings identical to said planar gratings and arranged symmetrical of said planar gratings in relation with a plane perpendicular to said direction of incidence.

3. System as claimed in claim 1, wherein said output means comprise mirror means arranged perpendicularly to said direction of incidence for reflecting back the N subcarrier waves supplied by said N optical modulators.

4. System as claimed in claim 3, wherein said mirror means comprise a single mirror.

5. System as claimed in claim 3, wherein said mirror means comprise N mirror elements arranged on said line, and respectively facing the output faces of said N optical modulators.

6. System as claimed in claim 1, wherein said output means comprise two further planar gratings identical to said planar grating; said further planar gratings and said planar gratings having in common a symmetry centre.

7. System as claimed in claim 6, wherein said symmetry centre is located on said line.

8. System as claimed in claim 1, wherein said source is a mode-locked laser.

* * * * *